United States Patent [19]
Abbott

[11] 3,881,747
[45] May 6, 1975

[54] VARIABLE MOTION BICYCLE PEDAL DRIVE SYSTEM

[76] Inventor: Allan V. Abbott, 708 Calle Arboles, Redondo Beach, Calif. 90277

[22] Filed: June 19, 1974

[21] Appl. No.: 480,656

[52] U.S. Cl. ............................................. 280/255
[51] Int. Cl. ............................................ B62m 1/04
[58] Field of Search..................... 280/255, 252, 246

[56] References Cited
UNITED STATES PATENTS

| | | | |
|---|---|---|---|
| 3,375,023 | 3/1968 | Cox..................................... | 280/255 |
| 3,633,938 | 1/1972 | Solomon et al..................... | 280/255 |

FOREIGN PATENTS OR APPLICATIONS

| | | | |
|---|---|---|---|
| 622,335 | 6/1961 | Italy.................................. | 280/255 |

*Primary Examiner*—Leo Friaglia
*Attorney, Agent, or Firm*—Harvey S. Hertz

[57] ABSTRACT

A variable motion bicycle pedal drive system enables a bicycle rider to vary the pedal path from the conventional circular path movement. The bicycle drive mechanism includes a drive wheel having a first drive sprocket which transmits motion to the drive wheel. A drive chain couples the first drive sprocket to a second drive sprocket. A frame member of the bicycle has the second drive sprocket secured thereto. The bicycle foot pedal is movable through an adjustable linkage to transmit one-way rotational power to the second drive sprocket. The variable motion pedal drive enables the bicycle rider to vary the path of the pedal to simulate running, walking or other desirable movements.

4 Claims, 4 Drawing Figures

PATENTED MAY 6 1975
3,881,747
FIG.1.
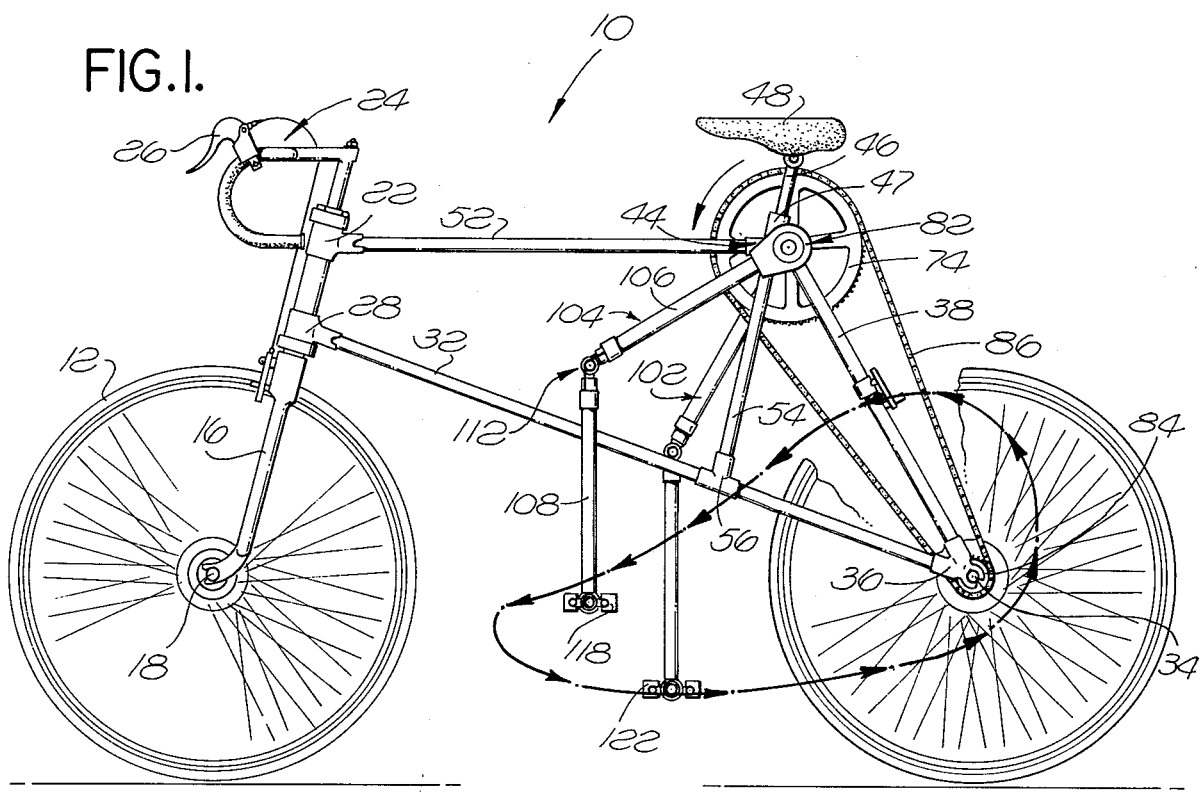
FIG.2.
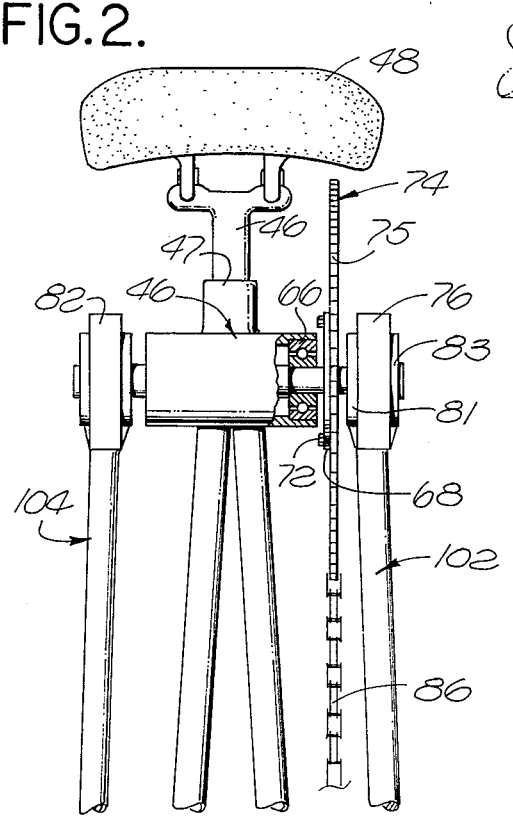
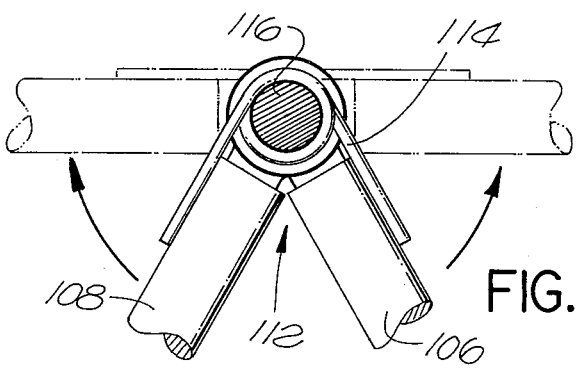
FIG.4.
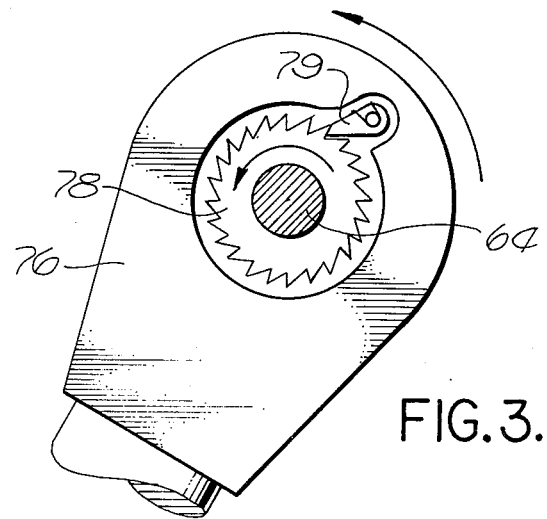
FIG.3.

VARIABLE MOTION BICYCLE PEDAL DRIVE SYSTEM

BACKGROUND OF THE INVENTION

1. Field of the Invention

The field of art to which the invention pertains includes the field of bicycle drive systems, particularly, with respect to a variable motion bicycle pedal drive system.

2. Description of the Prior Art

Conventional bicycle drive systems utilize a drive chain or other coupling mechanism which couples power from a drive axle to the bicycle drive wheel. The drive axle is normally moved along a path which is fixed with respect to the drive mechanism. On opposite sides of the drive axle a pair of pedals are mounted. The pedals are normally movable along a path which defines the perimeter of a circle. Cross country and high speed bicycles used in competitive racing have developed into sophisticated light weight machines utilizing multiple gear arrangements to improve speed while the rider pedals in a consistently defined circular pattern. However, over the centuries man has developed his legs for walking and running, and these motions are more natural and efficient than the limited circular conventional pattern.

Known prior art includes U.S. Pat. Nos. 279,356; 351,118; 941,471; 1,427,589; 1,564,548; 1,580,041; 1,739,628; 2,436,199 and 3,430,982.

The present invention provides a variable pedal path wherein the pedal used to drive the bicycle is freely positionable at all times by the bicycle rider. The freely positionable pedal provides a more natural type of movement which can provide a more efficient power transmission from the individual to the bicycle drive mechanism. The bicycle rider can transmit power along a pedal path which simulates running, walking or other type of foot movements and which have been found to be more efficient than conventional type circular pedaling paths.

SUMMARY OF THE INVENTION

A variable motion bicycle pedal drive mechanism is formed of at least one freely positionable foot pedal movable to transmit one-way rotational power to a drive sprocket. The bicycle contains a drive wheel having a driven sprocket secured thereto for transmitting motion to said driven wheel. A drive chain couples the drive sprocket to the driven sprocket. The freely positionable pedal is movable to transmit one-way rotational power to the drive sprocket.

The advantages of this invention, both as to its construction and mode of operation, will be readily appreciated as the same becomes better understood by reference to the following detailed description when considered in connection with the accompanying drawings in which like reference numerals designate like parts throughout the figures.

BRIEF DESCRIPTION OF THE DRAWINGS

FIG. 1 is a side view of a bicycle containing the variable motion pedal drive system constructed in accordance with the invention;

FIG. 2 is a partial rear view of the bicycle of FIG. 1 illustrating the particular connection of the pedal linkages to the drive sprocket of the bicycle;

FIG. 3 is a partial side view, partly in section illustrating the ratchet drive interconnection of the pedal linkage to the drive sprocket; and FIG. 4 is a partial side view, partly in section of a portion of the pedal linkage joint illustrating the mounting of the spring member therein.

DESCRIPTION OF THE PREFERRED EMBODIMENTS

Referring now to the drawings, there is shown a bicycle 10 containing the variable motion pedal drive system constructed in accordance with principles of the invention. Certain portions of the bicycle are of conventional design and will not be described in detail.

The bicycle 10 comprises a front or steering wheel 12 and a rear or drive wheel 14. A front vertical frame member 16 interconnects an axle 18 of the front wheel 12 and a top junction member 22. Handle bars 24 of the bicycle extend from the top junction member 22 and contain conventional handbrake grips 26.

A central junction member 28 is secured to the front vertical frame member 16 intermediate the axle 18 and the top junction member 22 and directly above the front steering wheel 12. A pair of lower interconnecting frame members 32 (one of which can be seen in FIG. 1) extends from the central junction member 28 to the rear axle 34 of the rear wheel 14. A pair of V-shaped mounts 36, (one of which can be seen in FIG. 1) are secured on opposite sides of the rear wheel axle 34. Each of the lower interconnecting frame members 32 is secured to one of the lower arms of the V-shaped mount 36. A pair of rear vertically extending frame members 38 (one of which can be seen in FIG. 1) extend from the upper arm of the V-shaped mount 36, respectively, and extend upwardly to opposite sides of a rear mount joint 44. An adjustable seat axle 46 extends upwardly from a socket joint 47 in the rear mount joint 44 and terminates at the base of the bicycle seat 48.

An upper horizontal frame member 52 is interconnected between the top junction member 22 at the front end of the bicycle and the rear mount joint 44. A pair of central vertical frame members 54 extend from a T-shaped joint 56 positioned on the lower interconnecting frame members 32, respectively, and terminate at the rear mount joint 44. The portions of the bicycle thus far described are conventional.

Referring now to FIG. 2, there is shown a symmetrical axle housing 62 which is secured to the rear of the rear mount joint 44 and whose axis is in a plane parallel to the axis of the bicycle rear axle 34. A drive axle 64 is centrally positioned in the axle housing 62. Bearing joints 66 (one of which is shown in FIG. 2) are positioned at the ends of the housing and enable the axle to rotate with respect to the housing. A portion of the axle 64 which extends from the right side of the axle housing 62 is secured to a transversely extending mounting plate 68. The plate in turn is secured by means of bolts 72 to a drive sprocket 74 having teeth 75 equally spaced along its perimeter. The drive axle 64 then extends through the mounting plate 68 and terminates in a unidirectional drive rotating joint 76.

The rotating joint 76 can be in the form of a ratchet gear 78 shown in FIG. 3 or can be made of a conventional series of drive rollers which enable power to be transmitted to the drive axle 64 only in the direction of rotation. Similarly, a second unidirectional power rotating joint 82 is secured to the other end of the axle 64.

When the unidirectional drive rotating joint is rotated in a direction shown by the arrow in FIG. 3, the pawl 79 integral with the rotating joint 76 causes the ratchet gear 78 and axle 64 integral with the gear 78 to rotate. Power is then transmitted from the axle 64 to the drive sprocket 74. However, when the unidirectional drive rotating joint 76 is rotated in an opposite direction, the ratcheting mechanism slips. Located on either side of the first and second unidirectional power rotating joint 76 are bearing housings 81 and 83, whose bearings (not shown) ride on the drive axle 64. The bearings allow free rotation of the joint and upper linkage rod only in one plane (no side to side movement). Similar bearing housings are provided on opposite sides of the rotating joint 82.

Referring again to FIG. 1, a second drive sprocket 84, smaller in diameter than the first drive sprocket 74, is secured to and rotates with the rear wheel 14 of the bicycle. A conventional endless chain 86 couples the first drive sprocket 74 and the second drive sprocket 84. As is conventional, when the first drive sprocket 74 is rotated by the drive axle 64, power is transmitted from the chain 86 to the second drive sprocket 84. Rotation of the second drive sprocket 84 in turn causes the rear wheel 14 of the bicycle to rotate in a counter clockwise direction as shown in FIG. 1.

A right foot drive linkage 102 and a left foot drive linkage 104 are secured to the base of the first and second unidirectional power rotating joints 76 and 82, respectively. The drive linkages 102 and 104 are identical and only the left foot linkage 104 will be described in detail. The left foot drive linkage 104 contains an upper linkage rod 106 and a lower linkage rod 108. The linkage rods are interconnected at one end by means of a spring-biased pivot joint 112 shown in greater detail in FIG. 4. The spring-biased joint enables the linkage rods to tend to move together at an acute angle as shown in FIG. 3. Additionally, as indicated by the arrows, the linkage rods can be separated so that they are positioned in a common plane as illustrated by the dotted lines in FIG. 4. A spring 114 is wound about a joint 116 with the ends of the spring secured to the adjacent ends of the upper and lower linkage rods 106 and 108, respectively, thus tending to keep the junction of the linkage rod at an acute angle. Stop means (not shown) can be provided so that the maximum separation between the rods 106 and 108 is 180° as shown by the dotted lines in FIG. 3. While the spring 114 aids in operation of the drive, its use is not absolutely essential.

The other end of the upper linkage rod 106 is secured directly to the base of the second unidirectional power joint 82. The free end of the lower linkage rod has a conventional bicycle pedal 118 secured thereto. Additionally, toe clips can be provided if necessary.

As can be seen in FIG. 1, the pedals 118 and 122 of the right and left foot drive linkages, respectively, are each freely positionable in a plane perpendicular to the axis of the drive axle 64. The only limitations as to the position of the pedals 118 and 122 are the length of the upper and lower linkage rods and the angular position of the spring-biased joint associated therewith.

In FIG. 1, the arrow path which depicts the path of travel of the pedals is shown to be similar to the path of the foot of a person when running. When riding the bicycle shown in FIG. 1, the rider would tend to move the pedals in this path when simulating running. Alternatively, the pedals could be used to simulate a walking path (not shown) or other desirable path. These paths are found to be more natural than the constant circular motion path used in a conventional bicycle drive. By utilizing the unique pedal movement of the present invention, greater efficiency and speed can be attained.

In addition, the variable motion system offers other advantages. Both the effective drive ratio and the pedal pattern characteristics may be changed by altering the relative lengths of the two linkage members. These changes could be accomplished while the bicycle is in motion.

I claim:
1. In a bicycle having a frame, a variable motion bicycle pedal drive mechanism comprising:
   a drive wheel on said frame having a first drive mechanism secured to said wheel for transmitting motion thereto;
   a second drive mechanism on said frame;
   a coupling member for coupling said first drive mechanism to said second drive mechanism;
   said second drive mechanism secured to said frame; and
   means mounting at least one foot pedal to be freely positionable in a plane intersecting the axis of the second drive mechanism and movable to transmit one-way rotational power to said second drive mechanism.

2. A variable motion bicycle drive mechanism in accordance with claim 1 wherein said foot pedal is secured to one end of a drive linkage;
   the other end of said drive linkage being coupled to said second drive mechanism.

3. A variable motion bicycle pedal drive mechanism in accordance with claim 2 wherein said drive linkage comprises an upper linkage rod and a lower linkage rod, a pivot joint joining said upper linkage and said lower linkage rod.

4. The variable motion bicycle pedal drive mechanism in accordance with claim 3 wherein said pivot joint is spring biased in a direction tending to bias said lower linkage rod toward said upper linkage rod.

* * * * *